(12) United States Patent
Millmore

(10) Patent No.: US 8,365,148 B2
(45) Date of Patent: Jan. 29, 2013

(54) AUTOMATED CODE REVIEW ALERT INDICATOR

(75) Inventor: Martin John Millmore, Berkshire (GB)

(73) Assignee: Oracle International Corporation, Redwood Shores, CA (US)

(*) Notice: Subject to any disclaimer, the term of this patent is extended or adjusted under 35 U.S.C. 154(b) by 1159 days.

(21) Appl. No.: 12/238,220

(22) Filed: Sep. 25, 2008

(65) Prior Publication Data
US 2010/0077375 A1    Mar. 25, 2010

(51) Int. Cl.
*G06F 9/44*       (2006.01)
(52) U.S. Cl. ....................................... 717/124
(58) Field of Classification Search .......................... None
See application file for complete search history.

(56) References Cited

U.S. PATENT DOCUMENTS

| 5,845,128 | A  | * | 12/1998 | Noble et al. | 717/170 |
| 6,658,660 | B1 | * | 12/2003 | Minyard | 717/171 |
| 6,895,577 | B1 | * | 5/2005 | Noble et al. | 717/126 |
| 2006/0150150 | A1 | * | 7/2006 | Tiwari et al. | 717/110 |

* cited by examiner

*Primary Examiner* — Wei Zhen
*Assistant Examiner* — Lanny Ung
(74) *Attorney, Agent, or Firm* — Kilpatrick Townsend & Stockton LLP

(57) ABSTRACT

The present invention provides a system for monitoring the production of computer program code, comprising an integrated development environment (IDE) for the production of computer program code and a component, integrated into the integrated development environment, adapted to monitor whether one or more sections of computer program code are generated automatically or manually, so as to determine a measure of the volume of computer program code manually produced by a developer.

22 Claims, 8 Drawing Sheets

AUTOMATED CODE REVIEW ALERT INDICATOR

FIELD OF THE INVENTION

The present invention is in the field of computer program code production. In particular, the present invention provides a system and a method for measuring the amount of computer program code produced by a developer.

DESCRIPTION OF THE RELATED ART

The development of computer software typically comprises the production of a certain quantity of computer program code. This code is often produced in a high-level programming language such as C++, Visual Basic, or Java. After production high-level program or source code may be compiled into object code for execution on particular hardware. After compilation, the object code may then be loaded into memory and processed by a processor to provide a wide variety of functionality, from configurable control routines for bespoke hardware to mass-market personal computing applications.

Computer program code produced in many programming languages has a line structure, wherein a number of commands and/or functions are discretely presented, one after each other on separate lines. In certain languages the end of a line is implicit, for example after the end of a command, and in other languages the end of a line is explicit, for example based on a line return or a chosen stop character. This line structure is present even in object-oriented languages, wherein the data used to implement objects within the languages is presented using lines of data methods or initialisations.

Computer program code may be produced either manually by an author or developer or automatically using software tools known in the art. To manually produce the code the developer will typically use a computer and user interface devices such as a keyboard and a mouse. In the simplest scenario the developer may simply manually enter, or write, lines of code into a text editor. However, depending on the language used, most modern code production is performed using one or more software tools that in combination comprise an integrated development environment (IDE). Examples of widely used IDEs are Microsoft Visual Studio, Eclipse, and Oracle JDeveloper.

When manually writing computer program code it is good practice for the author to regularly submit code for review or formal inspection after completion of a certain number of lines of code. For a typical software application, this may be between 200 to 800 lines. However, one problem with determining the volume of program code produced by a developer is that most modern IDEs provide software tools to auto-generate sections of computer program code. Such tools provide this option to reduce development time and duplication of labour. For example, many IDEs come with a number of templates for regularly used routines that can be incorporated into a developers' work. These templates may be applied using guided interfaces or "wizards". Alternatively, certain IDEs provide visual programming tools to allow rapid projection of program code: for example, within Microsoft Visual Studio one or more lines of code are automatically generated when a button is added to a form in a visual design environment and within Oracle JDeveloper, one or more lines of code are automatically generated when a field is added to a table. The mixture of automatically generated and manually entered computer program of code can make it difficult for a developer to ascertain the volume of computer program code that they themselves have generated.

In addition to the problem discussed above, different programming languages also have different levels of verbosity, i.e. the number of lines of code that are required to provide a common function or algorithm vary between languages. This makes it difficult to compare measures of computer program code production across different languages. For example, a given algorithm may require fewer lines of code within C++ than are required in Visual Basic. To partially overcome this problem, a measure known as effective lines of code (ELOC) may be calculated. ELOC attempts to provide a measurement of the volume of computer program code produced by a developer that accounts for the programming language used. Existing solutions typically calculate ELOC by taking the total number of lines of computer program code in a measured section and applying a scaling factor based on the programming language; for example the number of lines of code produced in C++ may be scaled up, whereas the number of lines of code produced in Visual Basic may be scaled down. Certain solutions may also set the value of this scaling factor based on the typical amount of program code that is auto generated in the selected language, for example languages known to provide environments that produce a large quantity of auto generated code may be scaled down. However, because the value of the scaling factor is typically set based on rules of thumb or other crude heuristics, such a method provides an inaccurate measure of the volume of computer program code that has been manually generated by the developer.

SUMMARY OF THE INVENTION

According to a first aspect of the present invention a system for monitoring the production of computer program code, comprises:

an integrated development environment (IDE) for the production of computer program code; and a component, integrated into the integrated development environment, adapted to monitor whether one or more sections of computer program code are generated automatically or manually, so as to determine a measure of the volume of computer program code manually produced by a developer.

In a preferred embodiment, the measure comprises a numeric value and the component is further adapted to compare the measure with one or more configurable measure ranges and determine when said measure is within one or more of the ranges. In this case the component may comprise a visual indicator, the appearance of the indicator being based on the result of the (range) determination.

The indicator may comprise text or one or more graphical icons. In certain embodiments each configurable range has an associated colour, the visual indicator displaying the appropriate colour based on the result of the determination. The indicator may also be configured to indicate whether the computer program code requires review and/or testing.

Preferably, the measure comprises the number of lines of executable code within the computer program code, wherein a line of code is typically determined based on known implicit or explicit line end criteria, such as stop characters.

In certain embodiments, the component is further adapted to provide a measure that is independent of the programming language of the computer program code, for example the component may be adapted to compute a first measure of the volume of computer program code manually produced by a developer that is dependent on the programming language of the computer program code and to scale the first measure to provide a final measure independent of the programming language.

In a preferred embodiment, the measure comprises a numeric value and the component is further adapted to provide an option to reset the measure to a set value. The measure may additionally comprise a measure of the volume of computer program code with a first program file, such as a Java class file, or within a project comprising a plurality of files that are edited by the developer.

In certain embodiments, the component may be adapted to compare the computer program code within the first program file with the computer program code within a second program file to determine the measure, the second program file comprising a copy of any automatically generated computer program code that has been inserted into the first program file.

Typically, the component is implemented by a processor processing program instructions stored in memory, wherein the program instructions are loaded into working memory in the context of program instructions implementing the IDE.

According to a second aspect of the present invention, a method for monitoring the production of computer program code comprises:
a) producing computer program code using an integrated design environment;
b) monitoring whether one or more sections of computer program code are produced automatically or manually; and
c) based on the monitoring step, determining a measure of the volume of computer program code produced manually by a developer.

In certain embodiments, the measure comprises a numeric value and the method further comprises:
d) comparing the measure with one or more configurable measure ranges; and
e) determining whether the measure is within one or more of the configurable measure ranges.

Such a method may also further comprise: f) displaying a visual indicator, the appearance of the indicator being based on the result of the determination performed in step e), wherein the visual indicator may comprise text or one or more graphical icons.

In a particular embodiment, each configurable range has an associated colour, step f) further comprising configuring the visual indicator to display the appropriate colour based on the result of the determination.

Preferably, the method also comprises g) reviewing and/or testing the computer program code following indication by the visual indicator, wherein the measure may comprise the number of lines of executable code within the computer program code.

In certain embodiments, the component is further adapted to provide a measure that is independent of the programming language of the computer program code, in which case step c) may further comprise:
c1) computing a first measure of the volume of computer program code manually produced by a developer that is dependent on the programming language of the computer program code; and
c2) scaling the first measure to provide a final measure independent of the programming language.

In certain embodiments, the measure comprises a numeric value and the method further comprises resetting the measure to a set point. The method may also further comprise repeating steps a) to c).

In certain embodiments, the computer program code may be produced in the form of a first program file and step (b) may comprise:

(b1) generating a copy of any automatically generated code that is inserted into the first program file during step (a) and storing the copy in a second program file; and
(b2) comparing the contents of the first program file and the second program file to determine the number of lines of unedited automatically generated code present in the first program file.

According to a third aspect of the present invention, there is provided a computer-readable medium comprising program code configured to perform the method of:
a) implementing an integrated design environment;
b) monitoring whether one or more sections of computer program code are produced automatically or manually; and
c) based on the monitoring step, determining a measure of the volume of computer program code produced manually by a developer.

BRIEF DESCRIPTION OF THE FIGURES

Embodiments of the present invention will now be described with reference to the accompanying drawings, in which.

DETAILED DESCRIPTION OF THE EMBODIMENT

Figure 1:
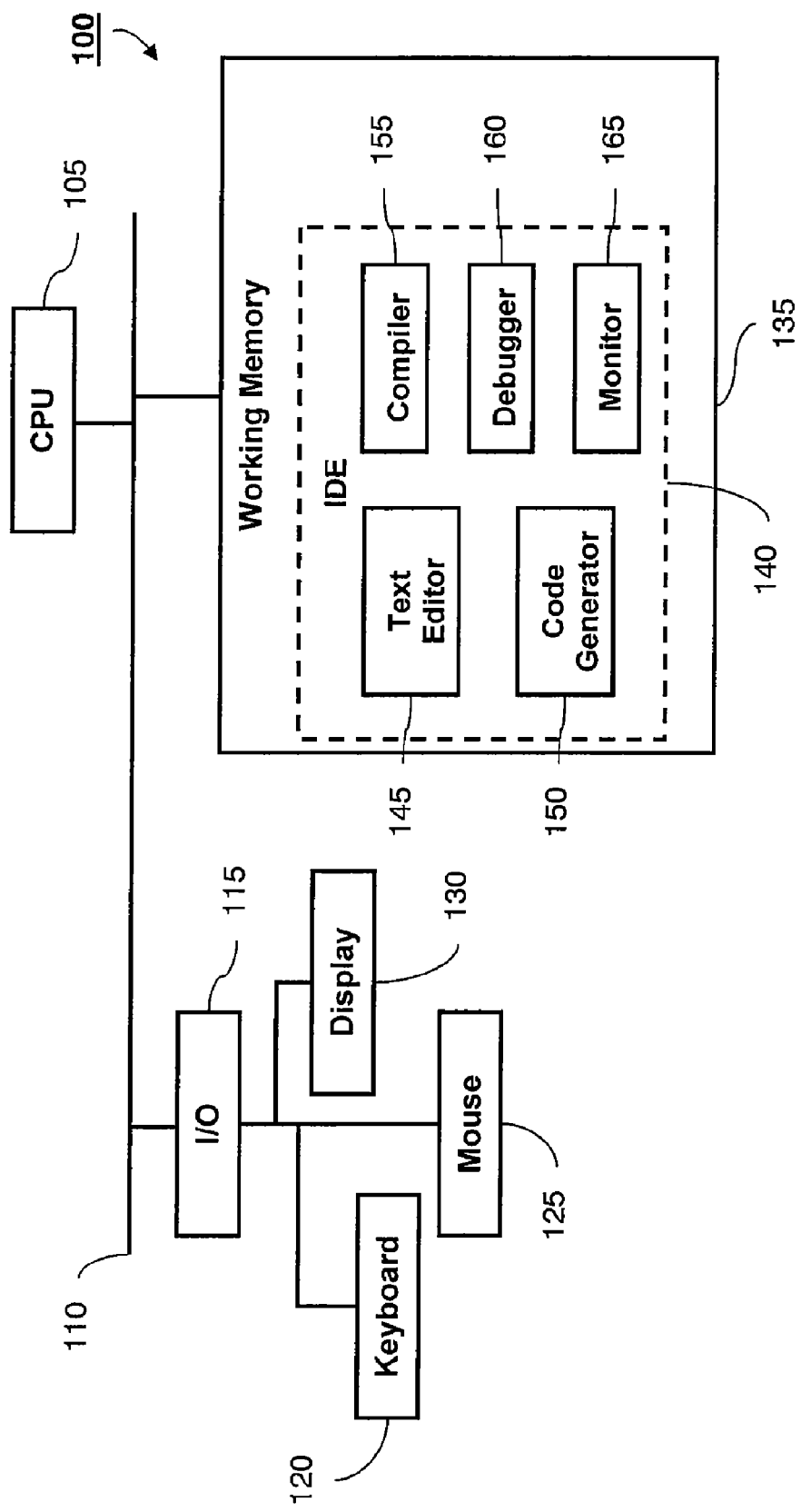
FIG. 1 illustrates schematically an exemplary system for implementing the present invention.

FIG. 1 shows an exemplary system 100 for implementing the present invention. The system 100 comprises central processing unit 105, communications bus 110, input/output (I/O) interface 115 and working memory 135. The I/O interface 115 enables one or more user interface devices to be connected, including, but not limited to, keyboard 120, mouse 125 and display 130. System 100 is provided as an example only and other devices and/or configurations may alternatively be used to implement the present invention.

In use, working memory 135 comprises program code loaded into memory for implementation on CPU 105. In the present example, program code configured to implement an integrated development environment (IDE) 140 and associated data is present within the working memory 135. The IDE 140 comprises one or more software tools for the production of computer program code. These software tools are loaded into working memory 135 as part of the implementation of the IDE and so may be said to be integrated into the IDE, i.e. the computer program code that implements the tools is processed by the processor within the context of the processing of computer program code that implements the IDE. In the present case, the IDE 140 comprises a text editor 145, a code generator 150, a compiler 155, a debugger 160 and a monitor component 165. Text editor 145, compiler 155, and debugger 160 are tools that are known within the art and may be selectively provided according to the need of a developer utilising the IDE. Code generator 150 comprises one or more tools adapted to automatically generate computer program code. For example, code generator 150 may comprise a number of design tools including tools for form design, i.e. the design of graphical user interfaces (GUIs), tools for database design or tools for object management. Such tools may enable a developer to insert a quantity of pre-written code into a current project. Monitor component 165 comprises computer program code configured to monitor the volume of computer program code produced by a developer using the IDE. As the monitor component 165 is implemented as part of the IDE, i.e. is integrated into the IDE, it is able to programmatically monitor, and if necessary programmatically access, the operation of other software tools within the IDE 140, the operation of the IDE 140 itself and the contents of working memory (i.e. data) used by the IDE 140 and the other software tools, including text editor 145 and code generator 150. In this context, the term "programmatically" may be interpreted as meaning "at the program level", i.e. associated with the operation of a program within working memory. The operation of the monitor component 165 will be described in more detail by way of example below.

Figure 2A:
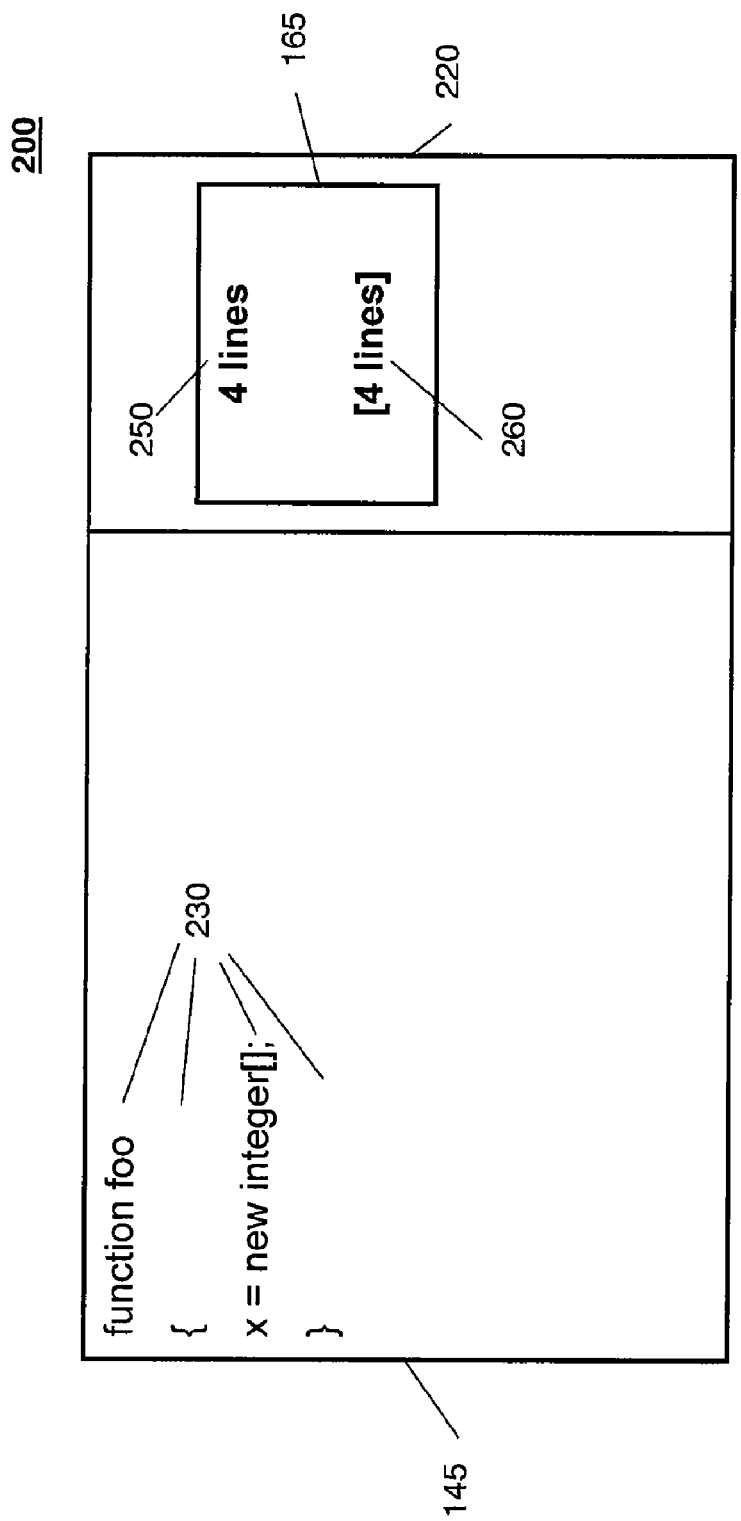
FIG. 2A illustrates the graphical user interface (GUI) components of a first embodiment of an exemplary integrated development environment (IDE) according to the present invention.

FIG. 2A shows an exemplary graphical user interface (GUI) for IDE 140. The GUI may be displayed on display 130 and a developer may interact with the elements of the display using user interface devices such as keyboard 120 and mouse 125. The GUI of the IDE 200 comprises a main window or form providing text editor 145 and an auxiliary window or form 220 that displays the visual output of monitor component 165. The presence of auxiliary window 220 is optional. The text editor 145 may be used to manually enter lines of computer program code 230.

The monitor component 165 is adapted to provide one or more measures of the volume of computer program code manually produced by the developer operating the IDE 100 and comprises two indicators: a first indicator 250 illustrating the number of lines of code that have been manually entered by a developer and a second component 260 showing a measure of the total number of lines of computer program code that are part of the current project. The second indicator 260 is optional and is provided in the present example to better explain the operation of the invention. In the example shown in FIG. 2A, the developer has manually entered four lines of computer program code 230 and thus the first indicator and second indicator both indicate four lines.

The code generator 150 of the IDE 140 provides means for the developer to automatically generate one or more lines of computer program code to implement certain features in the current project. In this context "to automatically generate" means to produce one or more lines of computer program code based on one or more lines of pre-written or pre-produced computer program code, i.e. based on code that has not been written by the present developer. For example, a standard function may comprise a plurality of lines of computer program code that have been written in the past and stored as part of the IDE program files or external libraries. As this pre-written code has typically been reviewed, debugged and possibly updated over time it often does not require further in-depth review or testing after insertion into a current project. The developer has the option of inserting this pre-written code into a current file or project by selecting an appropriate control component or menu item within the IDE 140; for example, auto-generated code may be added by selecting an appropriate menu item from a menu or toolbar of the IDE 140. The selection of the menu item or control component initiates appropriate routines within the IDE 140 or code generator 150 to load the pre-written code and insert it into the current file or project. Certain IDEs additionally provide a GUI for designing user interfaces for software applications. Such a GUI typically allows the developer to add control components to a blank or pre-prepared template form or screen.

Figure 2B:
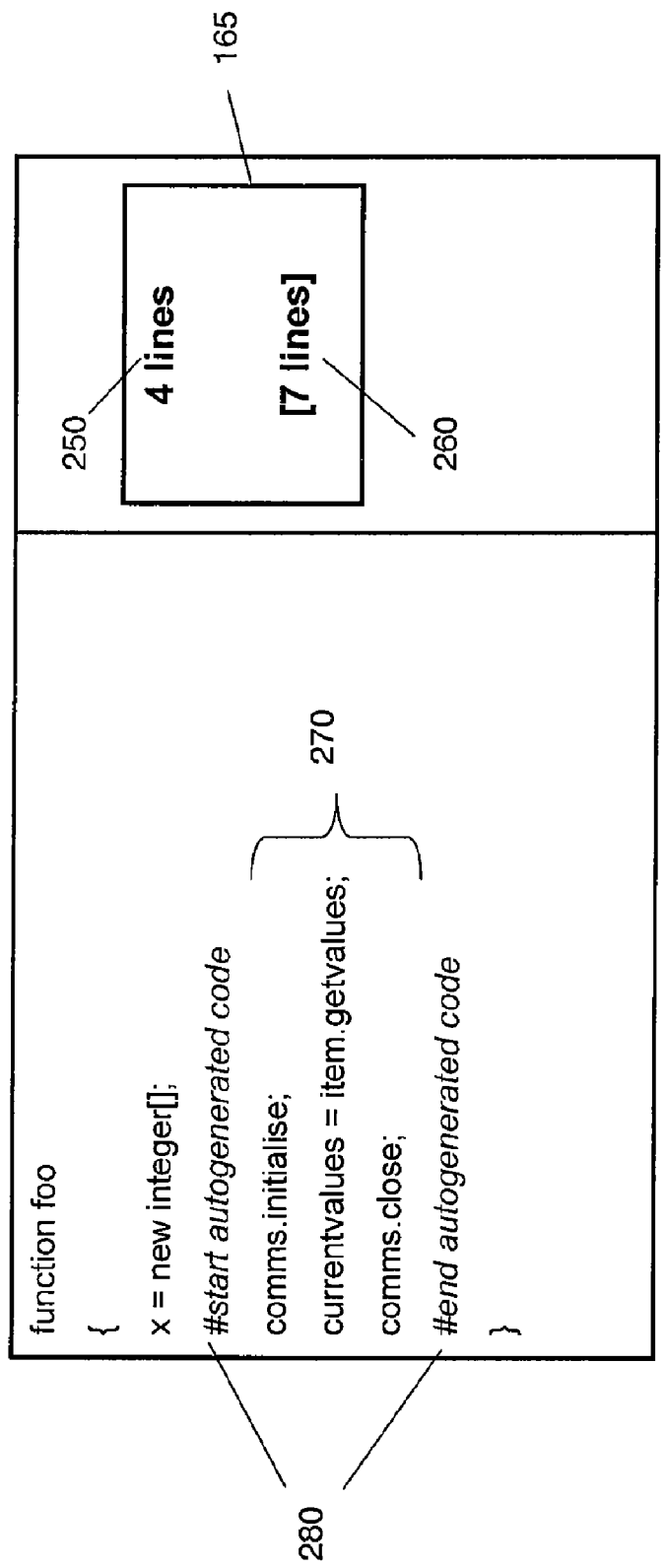
FIG. 2B illustrates the GUI components of the first embodiment of the exemplary IDE after the addition of automatically generated computer program code.

Turning to FIG. 2B, an example is provided wherein three lines of computer program code 270 have been auto-generated by the IDE. In the example shown in FIG. 2B, the auto-generated code is bracketed by two lines of comments 180 which signify the start and end of the auto-generated code. These comment lines are optional and in certain embodiments may not be provided.

Monitor component 165, being integrated into the IDE and present within working memory 135 during implementation of the IDE, is adapted to monitor the operation of the IDE and to record the occurrence of events that add automatically generated computer program code, together with the number of lines of automatically generated code that have been added. In the example shown in FIG. 2B, after the addition of the three lines of auto-generated code, the first indicator 250 remains at four indicating that no new lines of computer program code have been entered manually by the developer. However, the second indicator 260 has been updated to show that the total number of lines of code that comprise the project equals seven, reflecting the four manually entered lines 230 and the three automatically generated lines 270. The volume of code that is monitored could relate to a single project, i.e. a collection of one or more files associated with a particular software task, or multiple projects forming a "workspace". Additionally, the monitor component 165 may be adapted to monitor the computer program code produced by a plurality of developers. The level at which monitor component 165 operates and the number of developers that are monitored may be user configurable, for example using a configuration file that may be accessed by the monitor component 165.

Figure 2C:
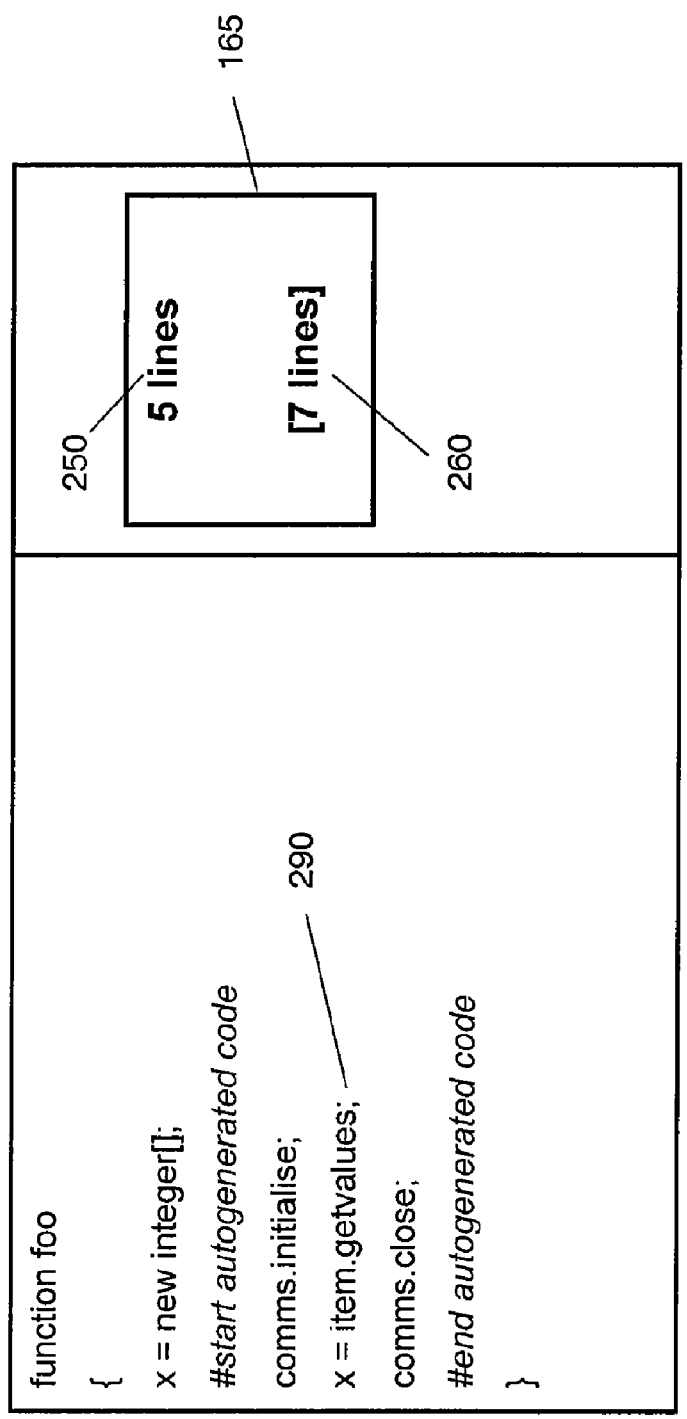
FIG. 2C illustrates the GUI components of the first embodiment of the exemplary IDE after manually editing a line of the automatically generated computer program code.

The monitor component 165 is also adapted to detect when a line of auto-generated code is manually edited. For example, in FIG. 2C, line 290 of the automatically generated computer program code has been manually edited to provide the required functionality ("currentvalues" has been replaced by "x"). After this edit, the first indicator 250 is updated to indicate that a further line of code has been manually edited (i.e. five lines in total) but the second indicator 270 remains at seven indicating that the total number of lines of code remains constant.

Monitor component 165 thus provides one or more indicators that show a developer when it is time to have their code reviewed. For example, by monitoring the first indicator 250, a review may be scheduled when the recorded number of manually entered lines of code exceeds a given threshold, for example 800 lines of code. After review the cumulative total of one or more of the indicators may be reset. In certain embodiments, the indicators may be reset by clicking on a control component forming part of the monitor component interface visible to the user. By integrating the component 165 into the IDE 140 the number of lines of code that are manually entered is calculated in real time. This differs from previous solutions wherein the number of lines of code was evaluated by scanning completed files containing computer program code.

The monitor component of the present invention may also be optionally adapted to apply a scale factor to one or more of indicators 250 and 260 to compensate for different levels of programming language verbosity. The scale factor may be predetermined based on configurable configuration data. In use the volume of code displayed by one or more of indicators 250 and 260 may be multiplied by the scaling factor to produce a volume measurement that is independent of the programming language used for development. The scaled measurements may then be displayed to a developer as well as, or instead of, indicators 250 and 260.

A further example of the present invention in use will now be described in the context of a Java-based IDE, Java being a platform-independent object-oriented language developed by Sun Microsystems, Inc. In an exemplary Java-based IDE, the IDE may provide tools to auto-generate computer program code to provide a Java representation of a database table. For example, the IDE may provide one or more tools to auto-generate 2000 lines of code and place this code in a file for use as a template. A developer may then customise this template file depending on the present application. In actual implementations the exact number of lines of computer program code may vary with the database table definition. In the present example, after automatically generating the code, the monitor component 140 records the number of lines of code that have been automatically generated. As the developer subsequently customises the template code by editing the file comprising the code using text editor 145, monitor component 165 compares the computer program code present in the edited file with the original generated content, to determine the number of new or edited lines. If the developer were to add 100 lines of computer program code and then further modify 50 lines of the automatically generated code, then the monitor component 165 would record that there are 150 lines of new or modified code out of a total of 2100 lines of computer program code in the present file.

In the prior art, most tools adapted to calculate the volume of computer program code produced by a developer only had access to the file comprising the computer program code. Such tools would scan the file to determine the volume of computer program code within and so could only inform a developer that there were 2100 lines of code that did not exist before. Even if prior art tools attempt to apply a large scaling factor based on the knowledge that the code language regularly produced a large quantity of automatically-generated code, they are not able to discriminate between 100 lines of auto-generated code with 2000 lines of manually written code, and 2000 lines of auto-generated code with 100 lines of manually written code. The scaling factor is thus simply a guess and can be very inaccurate. The present invention overcomes these difficulties and removes the guesswork from calculating the number of lines of code that have been written.

In addition to monitoring the volume of manually edited code within a single development session, the monitor component 165 may also be configured to record and store volume statistics for a particular file or project in persistent storage, such as within a file on a hard disk or solid state device. For example, the monitor component 165 may be configured to store volume statistics at regular time intervals and/or on exiting the IDE or the current project. When the IDE is subsequently activated, or one or more current project files are loaded within the IDE, the monitor component 165 may read the volume statistics from the persistent storage and configure indicators 250 and 260 accordingly. Hence, the monitor component 165 is able to track changes to the computer program code over a plurality of development sessions and may monitor the volume of computer program code produced by a developer over variable time periods between review sessions.

Figure 3A:
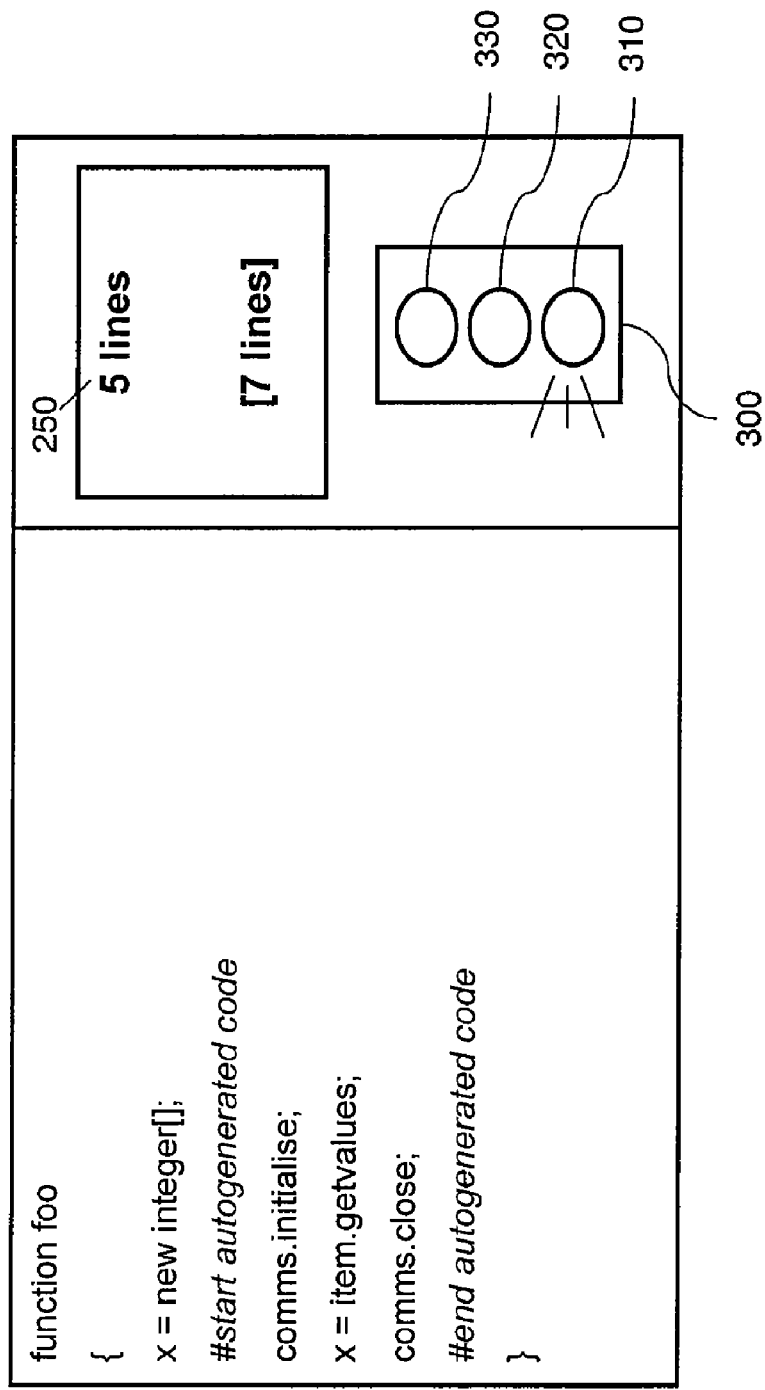
FIG. 3A illustrates the GUI components of a second embodiment of an exemplary integrated development environment (IDE) according to the present invention.
Figure 3B:
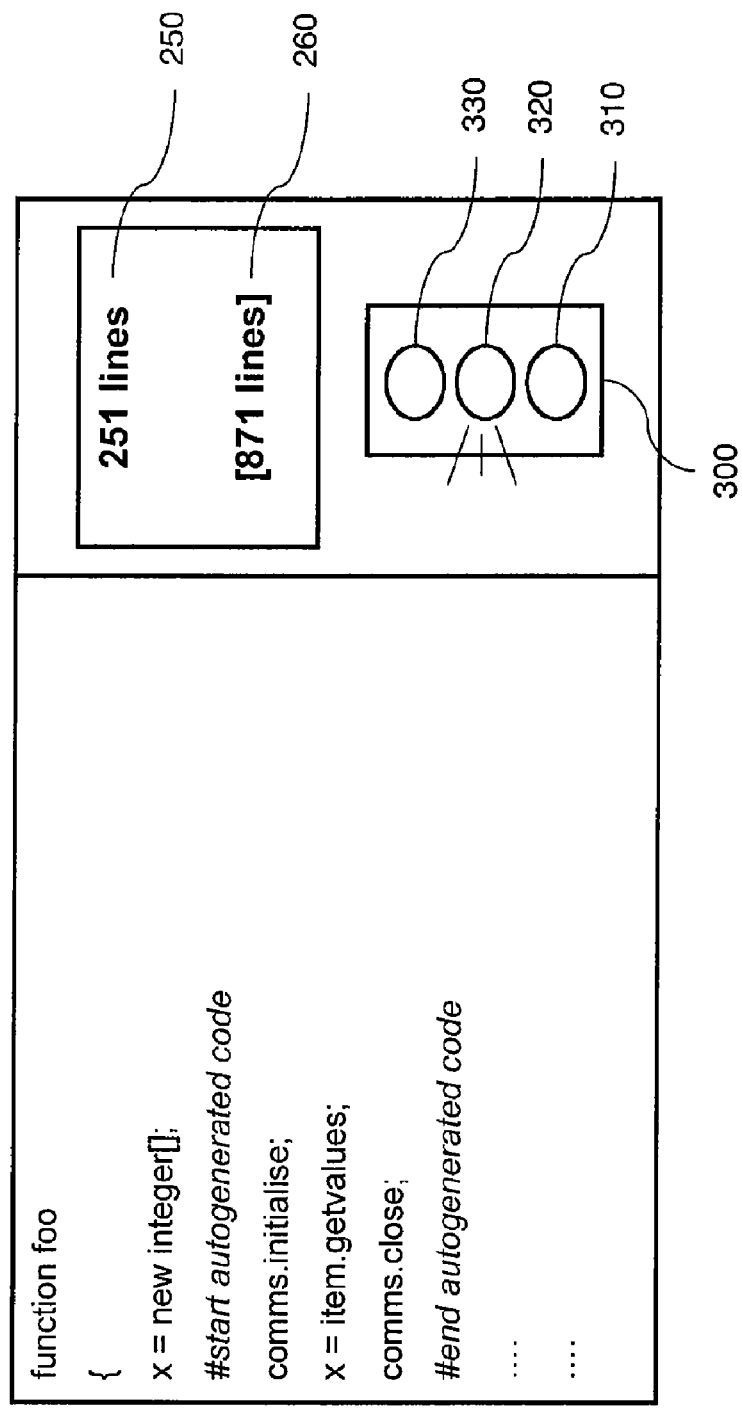
FIG. 3B illustrates the GUI components of the second embodiment of the exemplary IDE after the addition of a quantity of computer program code.
Figure 3C:
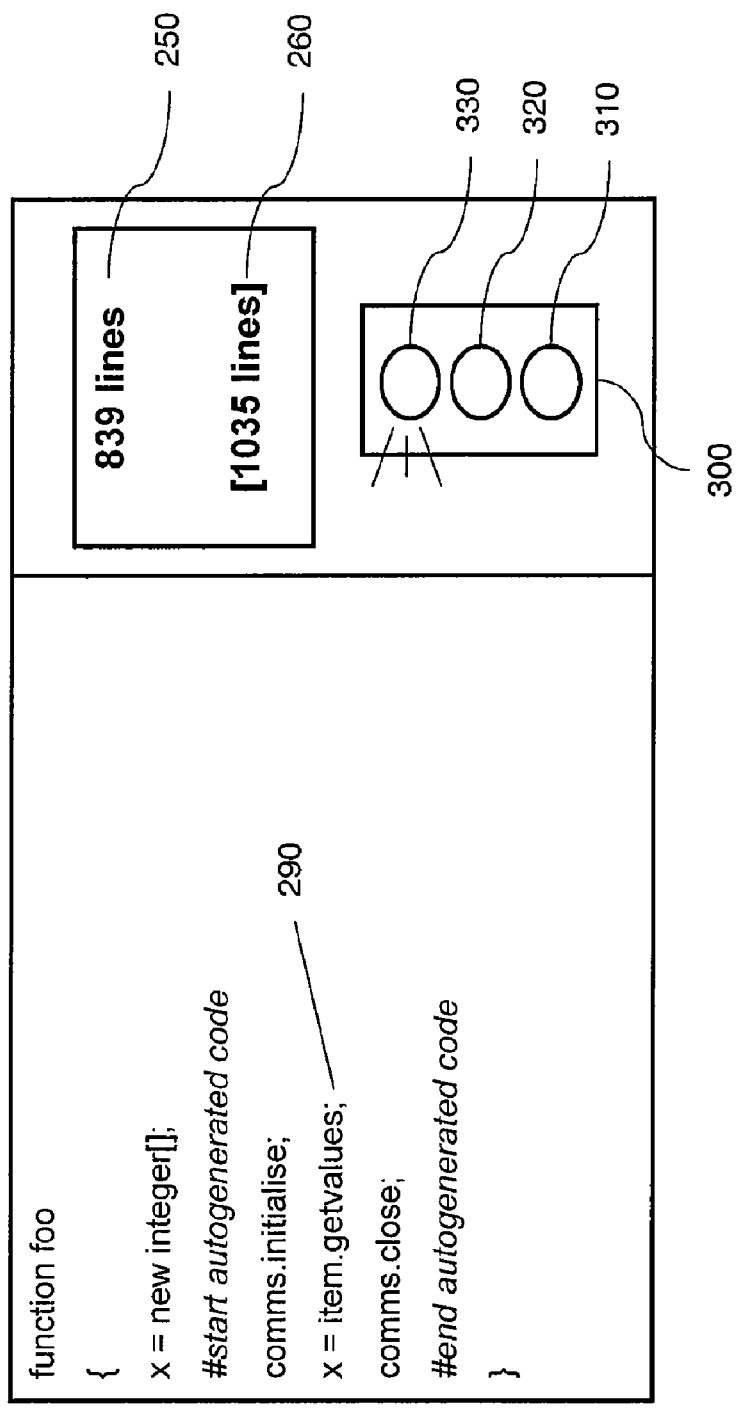
FIG. 3C illustrates GUI components of second embodiment of the exemplary IDE after the addition of a further quantity of computer program code.

A second embodiment of the present invention is shown in FIGS. 3A to 3C. The second embodiment is a variation of the first embodiment, providing the addition of a visual "traffic light" indicator to indicate when a code review is required. FIG. 3A shows an exemplary GUI of an IDE according to the second embodiment. In auxiliary pane 220 a graphical component 300 is displayed to a developer. Graphical component 300 provides a visual output for monitor component 165. The graphical component 300 may be provided in addition to, or instead of, text indicators 250 and 260. In FIGS. 3A to 3C the graphical component is provided in the form of a "traffic light", i.e. a control component comprising three colour components 310, 320, 330 aligned vertically. The colour components 310, 320, 330 are selectively activated to display a particular respective colour to the development. For example, in an activated state in a preferred embodiment, colour component 310 comprises a green circle, colour component 320 comprises an amber circle and colour component 330 comprises a red circle. In this preferred embodiment, in the de-activated state each colour component comprises a circle of a default background colour, such as the background colour of rectangle 300. In alternate embodiments, the appearance of graphical component 300 may be altered to suit required circumstances, for example different colours may be used, colour components 310, 320, 330 may be of a different shape or arranged horizontally etc. The position of the graphical component in relation to one or more of text indicators 250 and 260 may also vary depending on requirements and the arrangement of controls within the IDE GUI. Furthermore, graphical component 300 may be displayed together with one of text indicators 250 and 260 or may be displayed with both text indicators.

In use in the second embodiment, monitor component 165 is adapted to compare the volume of computer program code manually produced by a developer, for example as indicated by indicator 250, with one or more thresholds or ranges stored in memory. Such thresholds or ranges may be configurable and set by an administrator dependent on the characteristics of the present development project. The comparison may be performed in real time, i.e. instantaneously, at predetermined time intervals, or after one or more events such as edit of the computer program code.

In the example shown in FIGS. 3A to 3C there are three ranges defined by two thresholds. A first range, whose upper bound is set by a first threshold and whose lower bound is set at zero, represents a range of code volume values wherein a review is not required. This first threshold has a configurable value of 250 lines of computer program code. In FIG. 3A, the volume of computer program code manually produced by the developer is 5 lines. The monitor component 165 compares the volume of computer program code manually produced by the developer (5) with the first threshold (250). As the former is less than the latter, the volume is within the first range and the graphical component 300 is adapted to display colour component 310 in an activated state, i.e. as a green circle, and colour components 320 and 330 in a de-activated state, i.e. as default colour circles. The developer is then aware that nor review is required.

Turning to FIG. 3B, the developer has edited the computer program code, which now comprises a total of 871 lines of computer program code, 251 lines of which have been manually entered (i.e. 620 lines of automatically generated code).

In this situation, the monitor component 165 compares the volume of manually-entered code, as shown by indicator 250, with the first threshold (250). As the former is greater than the latter the volume of manually entered code is not within the first range. The monitor component 165 then compares the volume of manually entered code with a second threshold, in this case 800, representing the upper bound of a second range (the first threshold comprising the lower bound of said second range). In FIG. 3B, the volume of manually entered code is less than the second threshold and so the volume is within the second range. The graphical component 300 is thus adapted to display colour component 320 in an activated state, i.e. as an amber circle, and colour components 310 and 330 in a de-activated state, i.e. as default colour circles. The developer is then aware that they are nearing the time for a review and so a review should be scheduled.

In FIG. 3C, the developer has further edited the computer program code, which now comprises a total of 1035 lines of computer program code, 839 lines of which have been manually entered (i.e. 620 lines of automatically generated code). In this situation, the monitor component 165 compares the volume of manually-entered code, as shown by indicator 250, with the first threshold (250). As the former is greater than the latter the volume of manually entered code is not within the first range. The monitor component 165 then compares the volume of manually entered code with the second threshold (800). As the volume of manually entered code is greater than the second threshold and the volume is within a third range. The graphical component 300 is thus adapted to display colour component 330 in an activated state, i.e. as a red circle, and colour components 310 and 320 in a de-activated state, i.e. as default colour circles. The developer is then aware that they a review is overdue. Whereas the present example of second embodiment uses a number of thresholds to delineate a number of ranges, other comparison techniques used in the art may be used to provide the same functionality. Furthermore, even though the present example comprises three ranges and associated colour components, any number of ranges or components may be used in practice.

Figure 4:
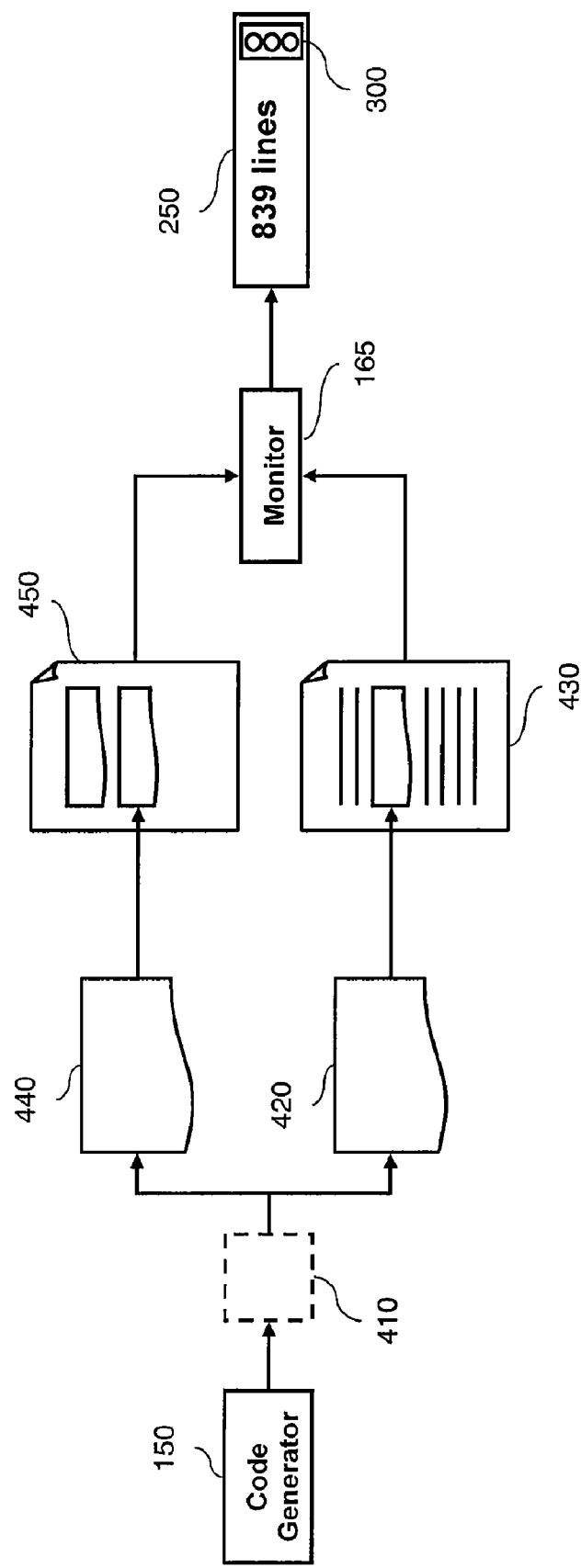
FIG. 4 schematically illustrates the process of monitoring the production of computer program code according to a third embodiment of the present invention.

A third embodiment of the present invention is shown in FIG. 4. The third embodiment provides a preferred method for distinguishing between manually edited and automatically generated code. FIG. 4 shows a simplified example of the interaction between the code generator 150 and the monitor component 165 within the context of the IDE 140.

According to the example of the third embodiment, a developer produces lines of computer program code in a similar manner to that described in the first and second embodiments. In this example, the developer either manually or automatically adds, edits or removes lines of computer program code from a file. This file may be of a variety of forms including Java or C++ class definitions, header files, executable routines etc. In certain embodiments, more than one file may be monitored.

When the developer performs the necessary user interface operations to initiate the adding of automatically generated computer program code, code generator 150 within the IDE 140 retrieves or generates the required code ready for insertion into the current file. In the present embodiment, the IDE 140 is modified so that an additional copy of the automatically generated code is produced. In the example of FIG. 4, intercept component 410 monitors the output of the code generator 150 and copies any code that is output by the code generator 150. In alternative embodiments within the scope of the present invention, code generator 150 or other components within the IDE 140 may be modified to produce the extra copy of the automatically generated code.

The two copies of the automatically generated code are shown in FIG. 4. A first copy of the code 420 is inserted into the code already present in the file 430 being edited by the developer, in a similar manner to that shown in FIG. 2B and described previously. However, in the present case, a second, separate copy 440 is also inserted into a second file 450 that is hidden from the developer. The second file 450 thus stores a copy of all the automatically generated code that is added to file 430. In FIG. 4, the second file 450 contains a copy of the presently inserted code 440 and a copy of a section of previously inserted code. As further automatically generated code is added to file 430, the second file 450 will be kept up to date, storing an unedited version of any inserted code. As the second file is hidden from the developer this process happens without the awareness of the developer, i.e. is transparent to the developer.

The first file 430 and the second file 450 are monitored by monitor component 165. The monitor component 165 compares the contents of the first file 430 with the contents of the second file 450 to determine how many lines of code differ between the two files. Such comparison may be performed using well known algorithms for comparing files that are known in the art. For example, one algorithm may take each line of code in the second file 450 in turn and determine whether file 430 contains a matching line. If a matching line is found the count of automatically generated lines is increased by one. If a line of automatically generated code in the first file 430 is edited by the developer in development, then such a line would no longer match its associated copy or sister line that was inserted into the second file 450. Hence, the present invention can determine when automatically generated code is edited by a developer and count this code as one or more lines of manually edited code.

Monitor component 165 may also count the total number of lines of code within the first file 430 using other common algorithms. The number of lines of automatically generated code counted by the monitor component using techniques such as those above may then be subtracted from the total number of lines of code within the first file 430 to generate a measure of the number of lines of code that have been manually produced or edited by a developer. This measure, or a indication based on this measure, may then be displayed to the developer using text indicator 250 and/or graphical component 300.

Any file that can be edited and saved to the file system used by the IDE 140 may be subject to the process of the third embodiment. Typically, the monitor component 165 is configured to compare files 430 and 450 to produce the measure of manually produced code either at regular time intervals (e.g. every 5 minutes), or whenever a line navigation occurs (e.g. hitting the return key, or navigating with the mouse 125 or keyboard 120). Such operation parameters may be user configurable and so may be edited based on the present task.

It is important to note that while the present invention has been described in a context of a fully functioning data processing system, those of ordinary skill in the art will appreciate that the processes of the present invention are capable of being distributed in the form of a computer readable medium of instructions and a variety of forms and that the present invention applies equally regardless of a particular type of signal bearing media actually used to carry out distribution. Examples of computer readable media include recordable-type media such as floppy disks, a hard disk drive, RAM and CD-ROMs as well as transmission-type media such as digital and analogue communications links.

The invention claimed is:

1. A system for monitoring production of computer program code, the system comprising:
   a processor; and
   a memory coupled with and readable by the processor and having stored therein a sequence of instructions which, when executed by the processor, causes the processor to execute an integrated development environment (IDE) for the production of the computer program code and a component, integrated into the integrated development environment, adapted to monitor whether one or more sections of the computer program code are generated automatically or manually, so as to determine a measure of the volume of computer program code manually produced by a developer, compute a first measure of the volume of computer program code manually produced by a developer that is dependent on the programming language of the computer program code, and scale the first measure to provide a final measure independent of the programming language.

2. The system of claim 1, wherein the measure comprises a numeric value and the component is further adapted to compare the measure with one or more configurable measure ranges and determine when said measure is within one or more of the ranges.

3. The system of claim 2, wherein the component further comprises:
   a visual indicator, the appearance of the indicator being based on the result of the determination.

4. The system of claim 3, wherein the indicator comprises text or one or more graphical icons.

5. The system of claim 3, wherein each configurable range has an associated colour, the visual indicator displaying the appropriate colour based on the result of the determination.

6. The system of claim 3, wherein the indicator indicates whether the computer program code requires review and/or testing.

7. The system of claim 1, wherein the measure comprises the number of lines of executable code within the computer program code.

8. The system of claim 1, wherein the measure comprises a numeric value and the component is further adapted to provide an option to reset the measure to a set value.

9. The system of claim 1, wherein the component is implemented by a processor processing program instructions stored in memory.

10. The system of claim 1, wherein the measure comprises a measure of the volume of computer program code within a first program file.

11. The system of claim 10, wherein the component is adapted to compare the computer program code within the first program file with the computer program code within a second program file to determine the measure, the second program file comprising a copy of any automatically generated computer program code that has been inserted into the first program file.

12. A method for monitoring production of computer program code, the method comprising:
   producing the computer program code using an integrated design environment;
   monitoring whether one or more sections of the computer program code are produced automatically or manually;
   computing a first measure of the volume of computer program code manually produced by a developer that is dependent on the programming language of the computer program code; and
   scaling the first measure to provide a final measure independent of the programming language.

13. The method of claim 12, wherein the measure comprises a numeric value and the method further comprises:
   comparing the measure with one or more configurable measure ranges; and
   determining whether the measure is within one or more of the configurable measure ranges.

14. The method of claim 13, further comprising:
   displaying a visual indicator, the appearance of the indicator being based on the result of determining whether the measure is within one or more of the configurable measure ranges.

15. The method of claim 14, wherein displaying the visual indicator further comprises displaying the visual indicator as text or one or more graphical icons.

16. The method of claim 14, wherein each configurable range has an associated colour, displaying the visual indicator further comprising configuring the visual indicator to display the appropriate colour based on the result of the determination.

17. The method of claim 14, further comprising:
   reviewing and/or testing the computer program code following indication by the visual indicator.

18. The method of claim 14, wherein the measure comprises the number of lines of executable code within the computer program code.

19. The method of claim 12, wherein the measure comprises a numeric value and the method further comprises resetting the measure to a set value.

20. The method of claim 12, further comprising repeating said producing computer code, monitoring whether one or more sections of computer program code are produced automatically or manually, computing the first measure, and scaling the first measure.

21. The method of claim 12, wherein the computer program code is produced in the form of a first program file and monitoring whether one or more sections of computer program code are produced automatically or manually comprises:
   generating a copy of any automatically generated code that is inserted into the first program file during producing the computer code and storing the copy in a second program file; and
   comparing the contents of the first program file and the second program file to determine the number of lines of unedited automatically generated code present in the first program file.

22. A computer-readable memory device having stored therein a sequence of instructions which, when executed by the processor, causes the processor to monitor production of computer program code by:
   implementing an integrated design environment;
   producing the computer program code using the integrated design environment;
   monitoring whether one or more sections of the computer program code are produced automatically or manually;
   computing a first measure of the volume of computer program code manually produced by a developer that is dependent on the programming language of the computer program code; and
   scaling the first measure to provide a final measure independent of the programming language.

* * * * *

UNITED STATES PATENT AND TRADEMARK OFFICE
CERTIFICATE OF CORRECTION

PATENT NO. : 8,365,148 B2  
APPLICATION NO. : 12/238220  
DATED : January 29, 2013  
INVENTOR(S) : Millmore Page 1 of 1

It is certified that error appears in the above-identified patent and that said Letters Patent is hereby corrected as shown below:

In the Claims

In column 12, line 25, in Claim 18, delete "claim 14," and insert -- claim 13, --, therefor.

In column 12, line 55, in Claim 22, delete "environment:" and insert -- environment; --, therefor.

Signed and Sealed this  
Fourteenth Day of May, 2013

Teresa Stanek Rea  
*Acting Director of the United States Patent and Trademark Office*